United States Patent [19]

Compagnon

[11] 4,020,524
[45] May 3, 1977

[54] COOLING INSTALLATION FOR USE IN PRODUCING INSULATED METAL WIRE

[75] Inventor: Michel Compagnon, La Tour-de-Peilz, Switzerland

[73] Assignee: Maillefer S.A., Switzerland

[22] Filed: Mar. 5, 1976

[21] Appl. No.: 664,419

[30] Foreign Application Priority Data

Mar. 14, 1975 Switzerland .................... 3303/75

[52] U.S. Cl. .............................. 15/302; 15/306 A; 134/64 R
[51] Int. Cl.² ...................... B08B 3/04; B08B 5/02
[58] Field of Search ........... 15/302, 306 A; 134/9, 134/15, 64 R, 64 P, 122 R, 122 P

[56] References Cited

UNITED STATES PATENTS

| | | | |
|---|---|---|---|
| 301,184 | 7/1884 | Tucker, Jr. .................. | 134/64 R X |
| 1,575,346 | 3/1926 | Lohn .............................. | 15/302 X |
| 2,135,713 | 11/1938 | Higgins ......................... | 134/64 R X |
| 2,880,739 | 4/1959 | Popp ............................. | 134/64 R X |
| 3,044,098 | 7/1962 | Stalson ......................... | 15/302 |
| 3,270,364 | 9/1966 | Steele ........................... | 15/306 A |
| 3,501,347 | 3/1970 | Kenmore ....................... | 134/15 X |

Primary Examiner—Robert L. Bleutge
Attorney, Agent, or Firm—Stevens, Davis, Miller & Mosher

[57] ABSTRACT

A cooling installation for use in the production of insulated metal wire which installation includes a vat and means for guiding wire longitudinally within that vat and for ejecting cooling fluid against the wire, the installation also including a motor situated outside the vat and means for accumulating the wire and means for pulling the wire, both said means being disposed within the vat. More particularly the pulling means is disposed between two portions of the accumulating means, one portion of the accumulating means adapted to accumulate a constant length of wire and the other adapted to accumulate a variable length of wire.

8 Claims, 5 Drawing Figures

COOLING INSTALLATION FOR USE IN PRODUCING INSULATED METAL WIRE

This invention relates to a cooling installation for use in producing insulated metal wire, the installation comprising a vat and means for guiding the wire longitudinally within the vat and for ejecting a cooling fluid against the wire.

The insulating sheath applied to a metal wire passing through the head of an extruder is generally cooled by ejecting water against the wire. This cooling process takes a certain amount of time, and when the wire is moving at high speed, it is necessary to provide relatively long vats and to guide the wire throughout the length of these vats. However, since the insulation is already cool enough for the wire to be supported, e.g., by a pulley, even before is has passed all the way through the vat, there exists the possibility of avoiding an overly long vat by having the wire pass over pulleys disposed at each end of the vat so that the wire can travel the length of the vat several times during the course of the cooling process.

It is an object of this invention to provide a cooling installation which is as compact as possible but which is nevertheless capable of cooling sufficiently the insulating plastic coating of a wire conveyed at high speed from the head of an extruder.

To this end, the cooling installation according to the present invention further comprises a motor situated outside the vat, means for accumulating the wire, and means for pulling the wire, both of these means being disposed within the vat.

The accumulating means may comprise two or more shafts and two or more pulleys having parallel axes, the pulleys being borne by the shafts. One shaft included in the pulling means may be rotatingly driven by the motor, and the accumulating means and the pulling means are adapted to cause the wire to travel several times over a cooling path between the shafts.

This arrangement provides an installation of reduced length which includes not only the vat and accumulating means but also means for pulling the wire; moreover, it may be equipped with drying facilities without increasing the length because, as will be seen further on, these drying facilities may be disposed above the vat.

A preferred embodiment of the invention will now be described in detail with reference to the accompanying drawings, in which.

Figure 1:
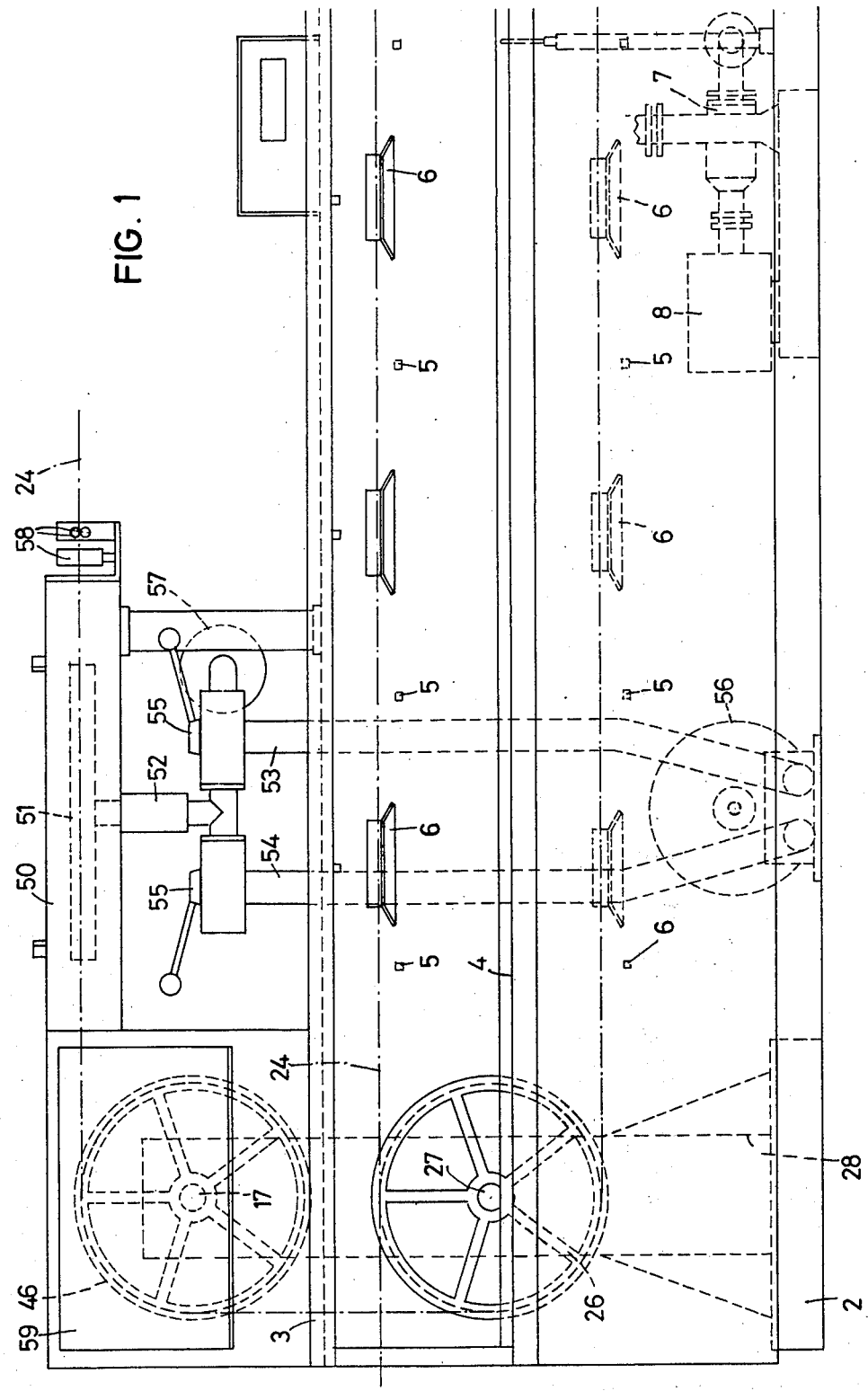
FIG. 1 is an elevation of the left half of the installation.
Figure 2:
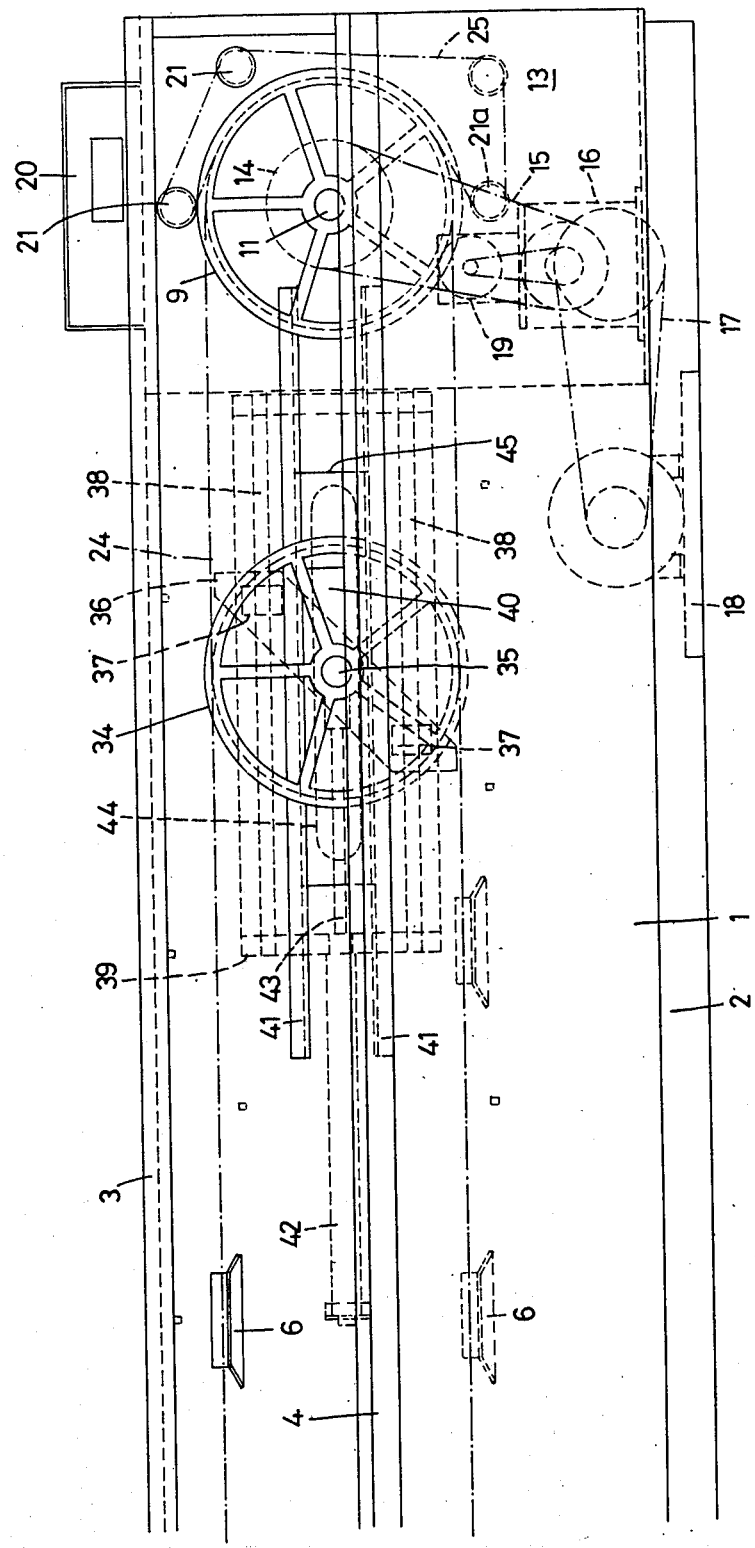
FIG. 2 is an elevation of the right half of the installation.

FIGS. 1 and 2 show the shape of a vat 1 made of sheet metal and mounted on a base 2. The vat 1 together with its base 2 may be made of welded sheets; it is preferably closed on all six sides, and its front face is equipped with longitudinal conduits 3 and 4 connected to supply and drain pipes so that it can be filled and emptied. Mounted in the rear wall are a series of jets 5 which project out horizontally from this rear wall inside the vat 1 and are connected outside the vat 1 to pipes for supplying water under pressure. Each jet 5 consists of a section of pipe provided along its upper generatrix with three conical nozzles having relatively large apertures and suitable for producing a fine spray of water. The number and positioning of the jets 5 may be selected as a function of the arrangement of the various devices disposed within the vat 1 to ensure that water is constantly ejected against all portions of the wire moving through the vat 1. Besides the jets 5, the rear wall also bears fixed guides 6 formed of sheet metal stamped and bent to partially surround the sections of wire to be described below and to avoid any possible vibration thereof.

Figure 3:
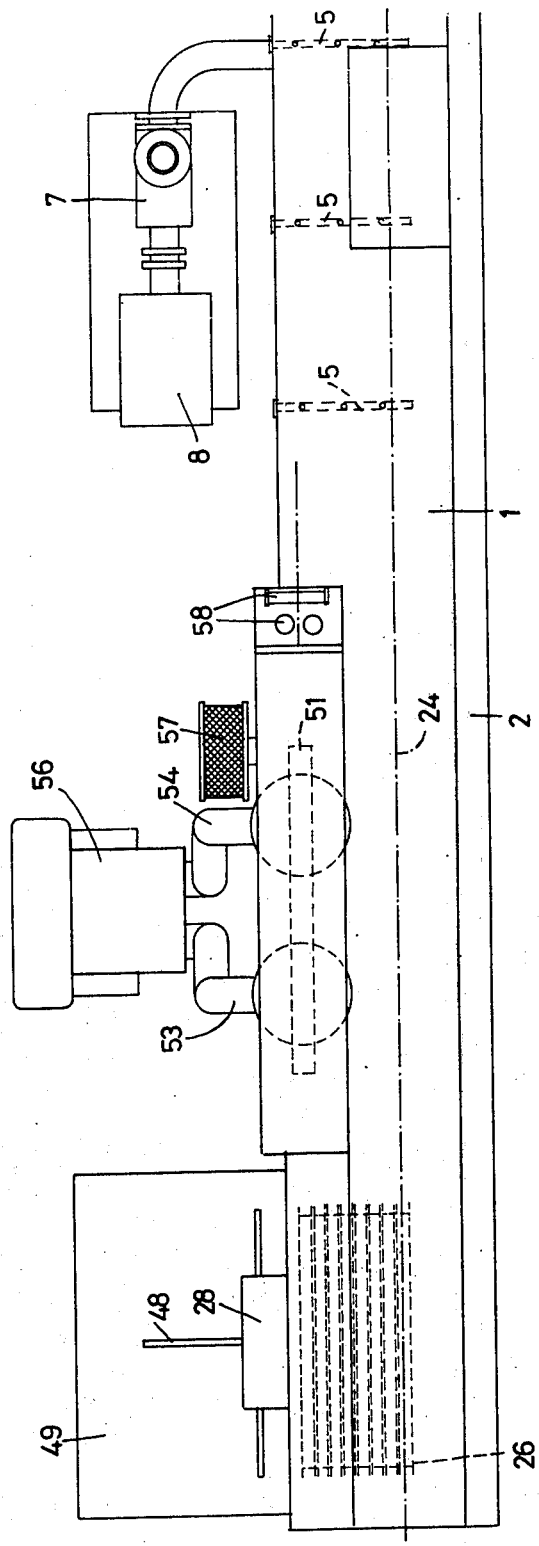
FIG. 3 is a top plan view of the left half.

The water reaching the jets 5 under pressure is supplied by a pump 7 (FIGS. 1 and 3) driven by a motor 8. This motor-pump unit is disposed beneath the vat 1.

The vat 1 is equipped with an accumulating device and a pulling device, these devices being partially combined as will be seen further on. The pulling device is situated at the right-hand end of the vat 1, hence opposite the point of entry of the wire. It comprises essentially a pulley 9 provided with a narrow, deep groove and secured by screws 10 (FIG. 5) to a shaft 11 borne by a bearing 12, the body of which is soldered to the wall of a vertical frame 13. The frame 13 is disposed behind the vat 1, and the bearing body 12 passes fluid-tightly through an opening in the rear wall thereof. The shaft 11 projects out horizontally from both sides of the bearing 12. Its outer end is provided with a drive pulley 14 (FIG. 2) connected by a belt 15 to the exit pulley of a speed-reducer 16 driven via a belt 17 by a motor 18. The reducer 16, the belt 15, and a measuring and regulating generator 19, also driven by the exit shaft of the reducer 16, are accommodated in the frame 13, with the motor 18 being disposed alongside this frame. Placed above the frame 13 is an operating and control box 20.

Figure 5:
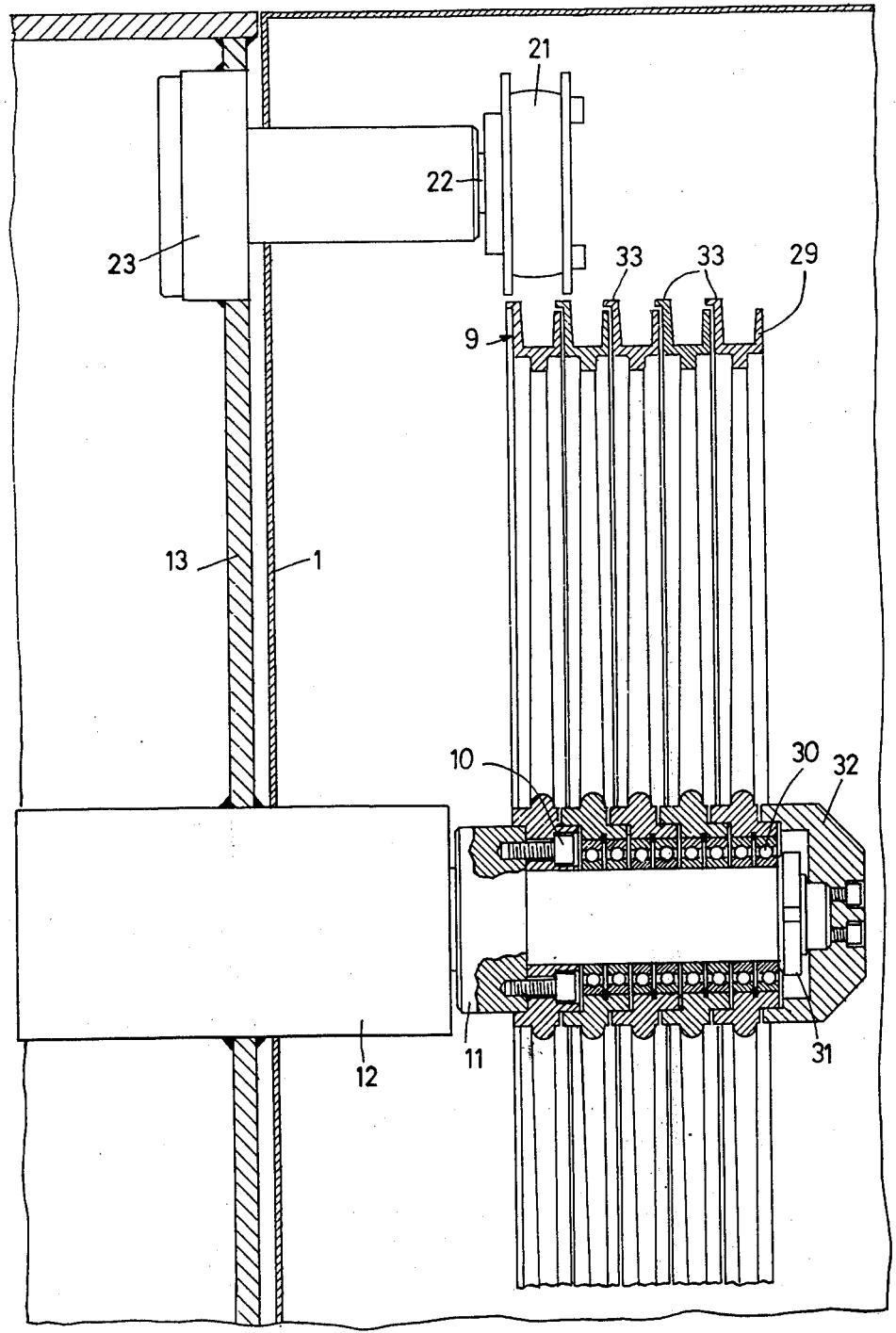
FIG. 5 is a partial section on a larger scale, taken on the line V—V of FIG. 4.

The pulling device also comprises a series of rollers 21, one of which is shown in detail in FIG. 5. These rollers 21 are mounted on shafts 22 borne by bearings 23 secured to the front wall of the frame 13. However, one of the rollers, 21a, serves as a tightener. It is borne by a lever arm (not shown) pivoting on the frame 13 and acted upon by a jack. The rollers 21 carry a belt (FIG. 2) forming an endless loop. Since the profile of this belt is adapted to that of the groove of the pulley 9, it will enter that groove over an arc of about 120° to 150° to press the wire 24, which passes over the pulley 9 for 180°, against the bottom of the groove. This arrangement ensures that the wire 24 will be driven by the pulley 9 at a speed which can be regulated by regulating the speed of the drive motor 18. Because the arrangement is as described, only the shaft 22 and 11, as well as the roller 21 and the pulley 9, are inside the vat 1. Even though these elements are exposed to the sprays of water, the operation of the pulling device is not disturbed thereby.

Nor do the sprays of water disturb the operation of the accumulating device, for it consists solely of shaft, shaft-supports, and pulleys mounted loose on the shafts.

Starting from the left-hand end of the vat 1 (FIG. 1), the accumulator comprises a first series of pulleys 26 mounted, for example, on ball bearings and borne by a horizontal shaft 27, the outer end of which is supported by bearings integral with a frame 28. The shaft 27 extends through the rear wall of the vat 1 and projects out into the latter. The pulleys 26 are of the same type as the pulley 9. In particular, the profiles of the grooves of these pulleys are like that of the groove of the pulley 9. One of the flanges of each pulley 26 has an outer rim 33 which covers the end of the other flange of the adjacent pulley 26. There are eight pulleys 26 in all. The four situated nearest the front wall of the vat 1 cooperate with four pulleys 29 which are mounted loose, via ball bearings 30, on the free end of the shaft 11 (FIG. 5). The ball bearings 30 are held in place by a locknut 31 protected by a cap 32. They ensure that the four pulleys 29 will rotate freely in parallel planes about the same axis as the pulley 9. The pulleys 29 are similar to the pulleys 26 and the pulley 9. The rim 33 of the fourth pulley 29 covers the front flange of the groove of the pulley 9. Thus the wire which passes continuously over the elements of the accumulator and of the pulling device runs no risk of being deviated and becoming squeezed in between two pulleys.

Figure 4:
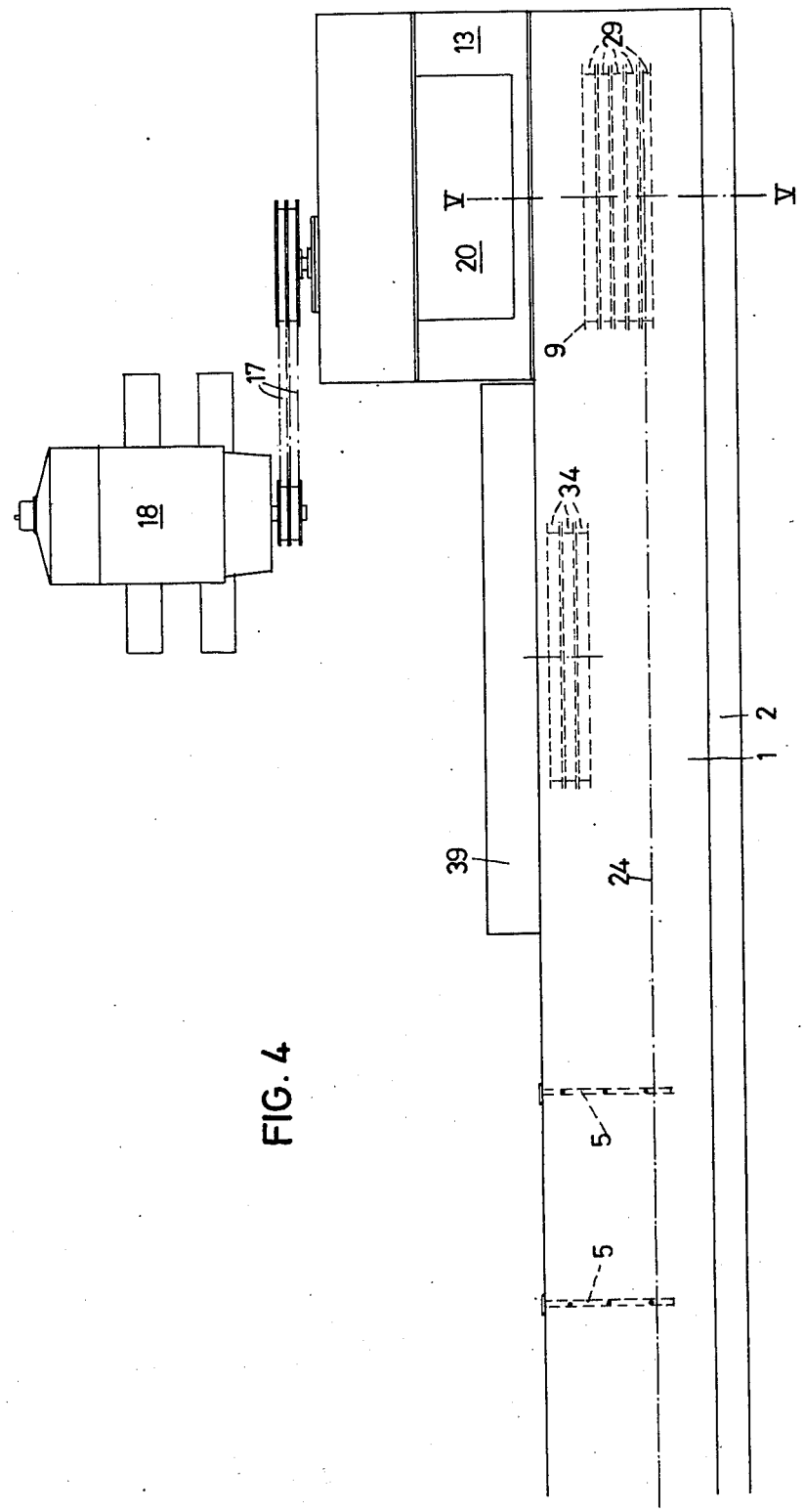
FIG. 4 is a top plan view of the right half.

The three pulleys 26 nearest the rear face of the vat 1 cooperate with three pulleys 34 which are of exactly the same type as the pulleys 29 and 26 and which are mounted loose on a shaft 35 (FIG. 2). The shaft 35 does not rotate, but it is mounted on a mobile unit comprising a diagonal cross-piece 36 provided with two bearings 37 slidable along two fixed guidebars 38 secured to rigid elements of a frame 39 disposed behind the vat 1. The bars 38 are attached by a rigid framework which constitutes the structure of the frame 39. In addition, the device includes a sliding carriage 40 guided by parallel slideways 41 and controlled by a jack 42, the rod 43 of which is movable horizontally, parallel to the length of the vat 1, to move the carriage 40 in translation. The shaft 35 is integral with the carriage 40 and the cross-piece 36. These three members form a mobile unit which effects a translatory motion as a whole. The shaft 35 passes through an elongated opening 44 in the rear face of the vat 1, which opening is closed by a plate 45 integral with the mobile unit. The device may be supplemented by a lever arm pivoting at the upper part of the frame 39 and comprising an elongated opening engaged on the shaft 35 to be driven by the reciprocating movement of the mobile unit. Via a pinion, such a lever may serve for actuating a measuring potentiometer capable of giving a signal corresponding at any given moment to the position of the pulleys 34. As has already been stated, the three pulleys 34 are of exactly the same size and shape as the pulleys 9, 29, and 26, and the shaft 35 projects out horizontally in the vicinity of the rear wall of the vat 1, whereas, as may be seen in FIG. 4, the series of pulleys 9 and 29 are spaced slightly farther from this rear wall than the three pulleys 34. The relative positions of the pulleys 34, 9, and 29 are clearly visible in FIG. 4.

Placed above the vat 1 at the entry end of the installation is a drying device. It comprises first of all a pulley 46 similar to the pulleys 9, 29, and 34. The pulley 46 is mounted loose on an axle 47 integral with the frame 28' which is a simple upright having reinforcing buttresses 48 and a base-plate 49. The pulley 46 is situated immediately above the last of the pulleys 26, which is in the immediate vicinity of the rear wall of the vat 1. It guides the wire for a quarter of a turn and centrifuges the water onto the walls of a fluid-tight compartment 59. Drying is completed in an enclosure 50 where, according to the diameter of the wire, the water is removed either by suction or by air-blowing.

In order to carry out these operations, the drying device comprises a blower 56, the intake of which is connected to a pipe 53 and the outlet to a pipe 54. Each of these pipes is provided with a gate 55. Each of the two gates 55 is connected to a common collector 52, which enters into the enclosure 50, and to an opening into the atmosphere, one of these openings being provided with a filter 57. The gates 55 are provided with control levers enabling each of them to be placed in two different positions. When drying is carried out by means of suction of the droplets through a suction ramp 51 which is connected to the collector 52, the levers of the gates 55 are disposed in such a way that the air circulates as follows: from the collector 52, the mixture of air and droplets passes into the pipe 53 and is then forced back through the pipe 54 towards the outlet opening of the gate 55 situated to the left in FIG. 1. For drying by means of blowing, on the other hand, the ramp 51 is replaced by a blowing nozzle, having a horizontal axis, through which the wire travels. In this case, the levers of the gates 55 are thrown so that the air is drawn through the filter 57 into the pipe 53 and forced back through the pipe 54 towards the collector 52 and the blowing nozzle. Upon leaving the enclosure 50, the wire passes between two pairs of guide cylinders 58 disposed at right angles to one another.

The path travelled by the wire 24 within the installation described will now be recapitulated. The wire enters at the left-hand end of the vat 1, coming from the extruder head, and passes into the groove of the first pulley 26, the pulleys always being counted from the front face of the vat 1. The wire then passes on to the groove of the first pulley 29 which turns loosely on the shaft 11 of the pulling device. It follows the groove of this pulley 29 for 180°, then returns to the second pulley 26 at the left-hand end of the vat 1, goes back towards the second pulley 29, and so on until it has passed over the fourth pulley 29. It then returns towards the fifth pulley 26, whence it heads for the pulley 9, which pulls it and consequently rotates the first five pulleys 26 and the four pulleys 29. All the portions of wire comprised between the shafts 11 and 27 are continuously sprinkled with water by the jets 5. After having been driven along by the pulley 9, the wire goes back onto the sixth pulley 26, whence it passes over the first pulley 34 mounted on the mobile unit of the accumulator. It then passes onto the seventh pulley 26, then on the second pulley 34, and so on, the length of wire accumulated in the extensible accumulator device thus being determined by the distance comprised between the pulleys 34 and 26. By regulating the air pressure in the jack 42, the wire is held at the tension necessary to keep it in the bottom of the grooves of the pulleys 29, 26, and 34. The longitudinal displacement of the mobile unit varies the length of wire accumulated between the pulleys 26 and 34 and compensates for the variations in speed of a take-up reel situated after the vat 1.

When the speed of the take-up reel is too great, the length of the wire between the pulleys 34 and 26 decreases, with the pulleys 34 moving closer to the pulleys 26. When the speed of the take-up reel is too low, the length of the wire between the pulleys 34 and 26 increases, thus the pulleys 34 move away from the pulleys 26.

The potentiometer, driven by the longitudinal movements of the pulleys 34, corrects the speed of the take-up reel and stabilizes the mobile unit. The last pulley 26 carries the wire on a quarter of its circumference and directs the wire towards the pulley 46, as described above.

What is claimed is:

1. A cooling installation for use in producing insulated metal wire, said installation comprising a vat and means for guiding said wire longitudinally within said vat and for ejecting a cooling fluid against said wire, further comprising a motor situated outside said vat, means for accumulating said wire, and means for pulling said wire, both said means being disposed within said vat, said pulling means comprising a pulley, and said accumulating means comprising two or more shafts and two or more pulleys having parallel axes, said pulleys being borne by said shafts, one said shaft being included in said pulling means and being rotatingly driven by said motor, and said pulley of said pulling means being rigidly secured to said one shaft, said accumulating means and said pulling means being adapted to cause said wire to travel several times over a cooling path between said shafts.

2. A cooling installation in accordance with claim 1, wherein said pulling means is disposed between two portions of said accumulating means, one said portion being adapted to accumulate a constant length of said wire, and the other said portion being adapted to accumulate a variable length of said wire.

3. A cooling installation in accordance with claim 2, wherein said accumulating means comprises a first series of said pulleys mounted loose on a first, fixed said shaft, a second series of pulleys mounted loose on said shaft included in said pulling means, and a third series of said pulleys mounted on a said shaft which is movable in translation in the longitudinal direction of said vat.

4. A cooling installation in accordance with claim 3, wherein said pulling means is situated at one end of said vat, the other end of said vat comprising a guide opening for said wire entering said installation and means for guiding said wire leaving said installation.

5. A cooling installation in accordance with claim 4, further comprising a drying means disposed above said vat, wherein a said pulley of said first series is adapted to deviate the path of said wire leaving said installation and to direct said wire towards said drying means.

6. A cooling installation in accordance with claim 1, wherein said pulling means further comprises a belt and one or more rollers, said belt being disposed on said rollers so as to engage in the groove of said pulley of said pulling means over at least part of its circumference and thereby to press said wire against the bottom of said groove.

7. A cooling installation in accordance with claim 1, further comprising two or more frames disposed outside said vat, said vat including a wall having fluid-tight openings, and said shafts being mounted on said frames and projecting out horizontally therefrom into said vat through said fluid-tight openings.

8. A cooling installation in accordance with claim 7, wherein said frames are all disposed on the same side of said vat.

* * * * *